United States Patent
Baldwin et al.

(10) Patent No.: US 9,047,584 B2
(45) Date of Patent: Jun. 2, 2015

(54) WEB-BASED USER INTERFACE TOOL FOR SOCIAL NETWORK GROUP COLLABORATION

(75) Inventors: Robert Michael Baldwin, San Francisco, CA (US); Daniel Sunil Chai, Sunnyvale, CA (US); Elliot Michael Lynde, Menlo Park, CA (US); Andrew G. Bosworth, Palo Alto, CA (US); Oswald Soleio Cuervo, Palo Alto, CA (US); Peter Deng, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 568 days.

(21) Appl. No.: 12/883,993

(22) Filed: Sep. 16, 2010

(65) Prior Publication Data

US 2012/0072855 A1    Mar. 22, 2012

(51) Int. Cl.
| | |
|---|---|
| *G06Q 10/10* | (2012.01) |
| *G06Q 50/00* | (2012.01) |
| *G06F 3/0481* | (2013.01) |
| *H04L 12/58* | (2006.01) |

(52) U.S. Cl.
CPC .............. *G06Q 10/10* (2013.01); *G06F 3/0481* (2013.01); *G06Q 10/107* (2013.01); *H04L 12/5815* (2013.01); *H04L 12/588* (2013.01); *G06Q 10/1093* (2013.01); *G06Q 50/01* (2013.01)

(58) Field of Classification Search
CPC ... G06Q 10/10; G06Q 10/107; G06Q 10/109; G06Q 10/1093; G06Q 10/1095; G06Q 50/01; H04L 12/58; H04L 12/581; H04L 12/5815; H04L 12/582; H04L 12/587; H04L 12/5855; H04L 12/588; G06F 3/048; G06F 3/0481; G06F 3/0482; G06F 3/04842
USPC ................... 715/751–759; 709/206; 705/26.1
See application file for complete search history.

(56) References Cited

U.S. PATENT DOCUMENTS

| | | | | |
|---|---|---|---|---|
| 7,275,215 | B2 * | 9/2007 | Werndorfer et al. | 715/752 |
| 7,865,563 | B2 * | 1/2011 | Moudy et al. | 709/206 |
| 7,913,178 | B2 * | 3/2011 | Gould et al. | 715/762 |
| 7,938,727 | B1 * | 5/2011 | Konkle | 463/42 |
| 8,037,139 | B1 * | 10/2011 | Fish et al. | 709/206 |
| 8,060,828 | B2 * | 11/2011 | Griffith et al. | 715/745 |
| 8,191,000 | B2 * | 5/2012 | Fischer et al. | 715/753 |
| 8,191,001 | B2 * | 5/2012 | Van Wie et al. | 715/757 |
| 8,307,029 | B2 * | 11/2012 | Davis et al. | 709/203 |
| 8,554,848 | B2 * | 10/2013 | Amento et al. | 709/206 |
| 8,639,762 | B2 * | 1/2014 | Rasmussen et al. | 709/206 |
| 8,732,590 | B2 * | 5/2014 | Barker et al. | 715/753 |

(Continued)

*Primary Examiner* — James T Durkin
(74) *Attorney, Agent, or Firm* — Fenwick & West LLP (57) ABSTRACT

Members of a social networking system group are provided multiple interfaces to communicate within the group. A first communication interface allows a user to upload a first content item; in response to this, the first content item is transmitted via a first communication channel to online members of the group. A second communication interface allows a user to upload a second content item; in response to this, the second content item is transmitted via a second communication channel to online and offline members of the group. Transmission via a first communication channel may comprise sending an instant message containing the first content item. Transmission via a second communication channel may comprise displaying the second content item on a group message board. Both interfaces may be contained within the group's web page or may be contained within another web page within the social networking system or outside of it.

20 Claims, 4 Drawing Sheets

(56) References Cited

U.S. PATENT DOCUMENTS

| | | | |
|---|---|---|---|
| 2004/0250212 A1* | 12/2004 | Fish | 715/752 |
| 2005/0055416 A1* | 3/2005 | Heikes et al. | 709/207 |
| 2006/0053380 A1* | 3/2006 | Spataro et al. | 715/753 |
| 2006/0173702 A1* | 8/2006 | Saxena et al. | 705/1 |
| 2008/0031203 A1* | 2/2008 | Bill | 370/338 |
| 2008/0114848 A1* | 5/2008 | Lira | 709/206 |
| 2008/0155080 A1* | 6/2008 | Marlow et al. | 709/223 |
| 2009/0106376 A1* | 4/2009 | Tom et al. | 709/206 |
| 2009/0112926 A1* | 4/2009 | Parker, II et al. | 707/104.1 |
| 2009/0132527 A1* | 5/2009 | Sheshagiri et al. | 707/5 |
| 2009/0132949 A1* | 5/2009 | Bosarge | 715/777 |
| 2009/0182823 A1* | 7/2009 | O'Sullivan et al. | 709/206 |
| 2009/0271283 A1* | 10/2009 | Fosnacht et al. | 705/26 |
| 2009/0327437 A1* | 12/2009 | Estrada | 709/206 |
| 2010/0057754 A1* | 3/2010 | Moudy et al. | 707/100 |
| 2010/0138491 A1* | 6/2010 | Churchill et al. | 709/204 |
| 2010/0185630 A1* | 7/2010 | Cheng et al. | 707/756 |
| 2010/0250685 A1* | 9/2010 | Kunz et al. | 709/206 |
| 2011/0010182 A1* | 1/2011 | Turski et al. | 705/1.1 |
| 2011/0179126 A1* | 7/2011 | Wetherell et al. | 709/206 |

* cited by examiner

WEB-BASED USER INTERFACE TOOL FOR SOCIAL NETWORK GROUP COLLABORATION

BACKGROUND

This invention relates generally to social networking, and in particular to user interfaces for the sharing of information among members of a social networking system group.

As the technological capabilities and prevalence of social networking have advanced, the ability of a social networking system user to share information has progressed accordingly. When combined with the ability of users of social networking systems to create and join social networking system groups, the ability to share information extends beyond communication with a single recipient. Members of a social networking system group may share information amongst themselves for a variety of purposes, including but not limited to academic or professional collaboration. Each of the variety of contexts in which collaboration among group members is possible possesses a distinct set of needs to maximize the effectiveness of information sharing. As a result, there is a need for flexibility in communication among group members to accommodate this variety of collaborative contexts.

Current social networking systems provide some interfaces for communication among users. Non-real-time communication, such as posting a message on a social networking system "wall," is one such communication, and is available within the context of a social networking system group. Social networking systems often also provide email-like inboxes for messages sent within the social networking system. Further, some real-time communication solutions are also available, such as targeted instant messaging between two users of a social networking system. However, current social networking system communication schemes do not provide comprehensive communication solutions that accommodate multiple collaborative needs within the context of a social networking system group.

SUMMARY

To address the needs of groups of people interacting online in a collaborative fashion, embodiments of the invention provide multiple interfaces in which members of a group can communicate. The members of the group may be online or offline at any given time, and the multiple different communication interfaces may each allow communication with some or all members of the group. Each communication interface utilizes a communication channel, which may be directed to the members of the group based on whether they are online or offline. A user may request to communicate to group members currently online through a first communication interface. In response to receiving this request, the first communication interface utilizes a first communication channel directed to online group members. Likewise, a user may request to communicate to all group members, whether online or offline, through a second communication interface. In response to receiving this request, the second communication interface utilizes a second communication channel directed to all group members.

In one embodiment, users of a social networking system can join a group, which may be closed or open. The social networking system may provide a web page that contains the first and second communication interfaces. For example, group members may post to a message board on the web page, and the other members may receive notifications of the posts. In another example, a member may initiate a chat (or other immediate communication mechanism), which sends an instant message of the member's comments to any or all members of the group who are currently online (a "group chat").

The communication may be a content item, which may be text, an image, a video, a song or other audio clip, a document, or any other computer-formatted file. In one embodiment, the group members' further comments about a particular content item are sent only to those group members who have subscribed to the content item. For instance, when a first group member subscribes to a content item, and a second group member communicates in response to the content item, the first group member may be forwarded the second group member's communication. In another embodiment, communicating via the first communication interface or the second communication interface comprises editing a document within a social networking system web page. For example, group members may have access to a spreadsheet hosted within the social networking system, and may each edit the spreadsheet separately or simultaneously. In another embodiment, a notification of the content item is sent to members of the group.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Online social networking systems allow users of the social networking system to create profiles comprising information input by the users, typically about themselves. Users can in turn share all or part of the information in this profile with other users. Some social networking systems also maintain logs of user activity. User activity logged by the social networking system includes but is not limited to a user establishing a connection (e.g., becoming "friends") with another user within the social networking system, a user changing information in their profile, a user uploading photos to the social networking system, and a user's communications with other users. Portions of logged user activity may be made public as part of the user's profile; the section of the user profile where user activity is displayed is referred to as a user's "wall" or a profile's "message board." When a user is accessing a social networking system, such as by logging into the social networking system, viewing a web page within the social networking system, communicating through the social networking system, or has otherwise accessed a resource of the social networking system within a period of time, the user may be considered to be online; otherwise, the user may be considered to be offline.

Social networking systems are increasingly being utilized for academic, professional and personal productivity. Part of the reason for the increase in use of social networking systems for productive purposes is the ability to communicate with a pre-designated subset of social networking systems users in order to accomplish a particular purpose. The ability to form social networking system "groups" provides for the formation of the desired social networking system subset of users. Groups comprise communities of social networking system users that share a common interest, association or affiliation. Social networking system users that wish to become part of such a community typically first join a group. Once a user has joined a group, the user becomes a group member, and the collection of group members is referred to as the group's membership. Some groups allow any user of the social networking system to join; these groups are referred to as "open." Other groups may require users to request membership in the group; these groups are referred to as "closed." Yet other groups may require an invitation by an existing group member in order for a user to become a member.

Groups typically have a dedicated web page within the social networking system, the web page serving as an information hub for the group's members to access information about the group, group events, group photos and other group features are visible to users of the social networking system. In addition, groups may contain document-editing capabilities (for instance, through a group web page dedicated to document-editing), and interactive calendar capabilities (for instance, through a group web page dedicated to event scheduling). In some instances, these features are only visible to members of the group. In other instances, these features are visible to both members and non-members of the group. In yet other instances, a subset of the information visible to group members is visible to non-members.

From the perspective of a social networking system, each social networking system user is represented as a node within the social networking system. Groups are also represented as nodes, and when a user joins a group, the user's node and the group's node become connected. A group's membership comprises a series of connections between the group and the group's members. As every group member node is connected to the group node, group member nodes are connected to each other through the group node.

Communication among users of a social networking system can take many forms. For example, some social networking systems allow users to send emails to other users outside the context of the social networking system. Similarly, some social networking systems allow users to send email-like messages entirely within the social networking system. Some social networking systems allow a first user to post messages to a second user's profile, in particular to the wall portion of the profile, where the message is visible to other users who can view the second user's profile. In other social networking systems, users can send "chats" or "instant messages" with other users. These forms of communication are characterized by real-time communications sent back and forth, similar to a real-time verbal conversation. Chats and instant messages occur in web pages or software windows known as chat rooms or chat windows. Further, communication need not be limited to messages of only text; for instance, a communication may be in the form of an image file, a video file, an audio file, a document file, or any other format of file. As used herein, therefore, a communication between or among users may simply comprise a "content item." In addition, many of these forms of communication within a social networking system are applicable within the context of a social networking system group. For instance, a group may have a profile akin to a user profile, and the profile may also contain a wall portion of the profile where members of the group can post content items. A social networking system may send a notification (for instance, via email) to users of the social networking system when the users receive content items from other users in their social networking system inbox, via instant message, or via wall post.

Figure 1:
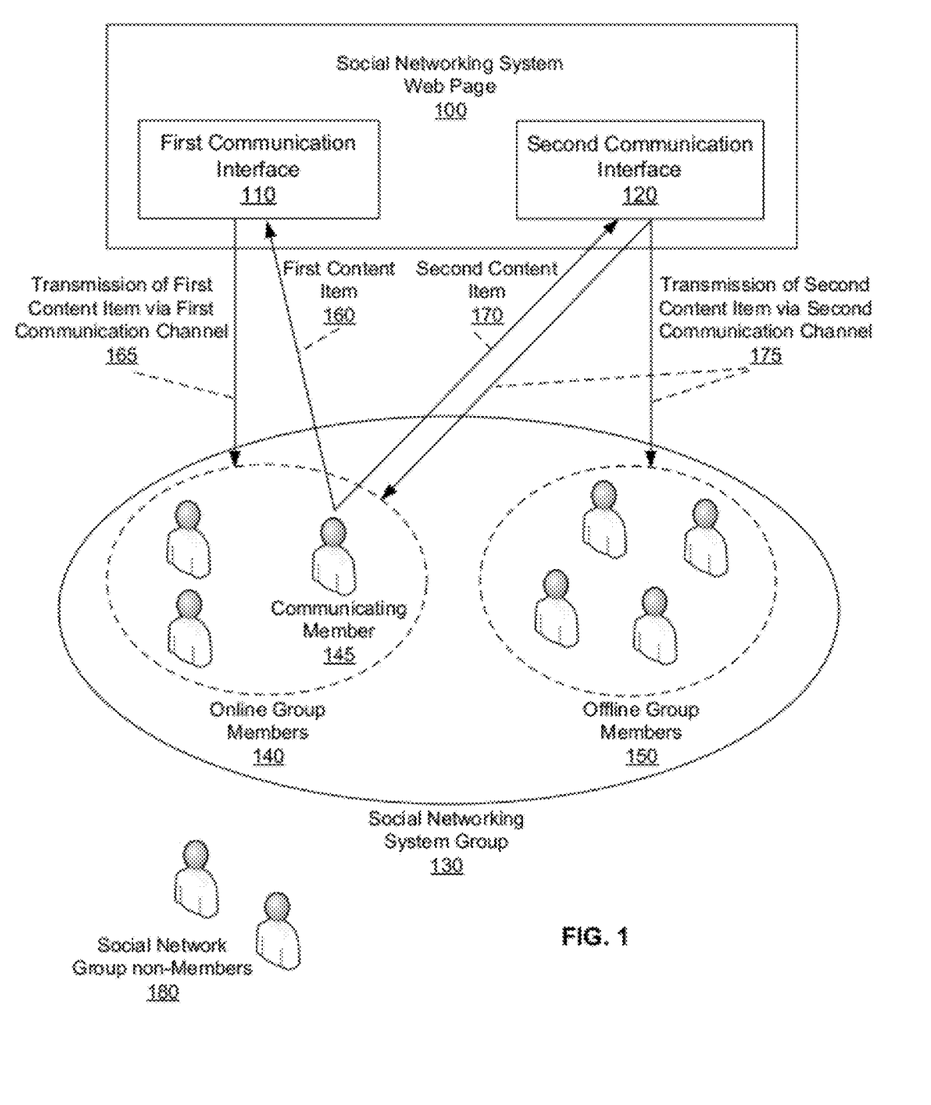
FIG. 1 is a diagram of the overall process for communication between social networking system group members through multiple communication interfaces, in accordance with one embodiment of the invention.

FIG. 1 is an overall conceptual diagram of a process in which members of a group communicate through multiple interfaces provided by the group. At any given point in time, the members of social networking system group 130 may include both online social networking system users 140 and offline social networking system users 150. The social networking system group 130 is associated with a social networking system web page 100 provided by the social networking system, and the web page 100 comprises communication interfaces 110 and 120.

As illustrated, a communicating online member 145 may use the first communication interface 110 to upload a first content item 160 to the social network. The first communication interface 110 sends a notification of the first content item 160 to online group members 140 via the first communication channel 165. The communicating member 145 may use the second communication interface 120 to upload a second content item 170 to the social network. The second communication interface 120 sends a notification of the second content item 170 to online group members 140 and offline group members 150 via the second communication channel 175. Non-group member users of the social networking system 180 are not sent either content item.

In one example, the first communication interface may be a social networking system group profile wall, where members of the group may post content items that are viewable to some or all members of the group. In this example, in response to the posting of a content item to the wall, a notification is sent to all group members, via email or any other messaging system other than the wall, either within the context of the social networking system or outside the context of the social networking system. In one example, the second communication interface may be an instant messaging interface, where members of the group may post content items that are viewable to some or all online members of the group. In this example, in response to the posting of a content item to the wall, a notification is sent to all group members, via instant message or any other messaging system within the context of the social networking system or outside the context of the social networking system. However, many other types of communication interfaces may be used. The examples given are merely demonstrative, and are not meant to limit the scope of the invention.

System Architecture

Figure 2:
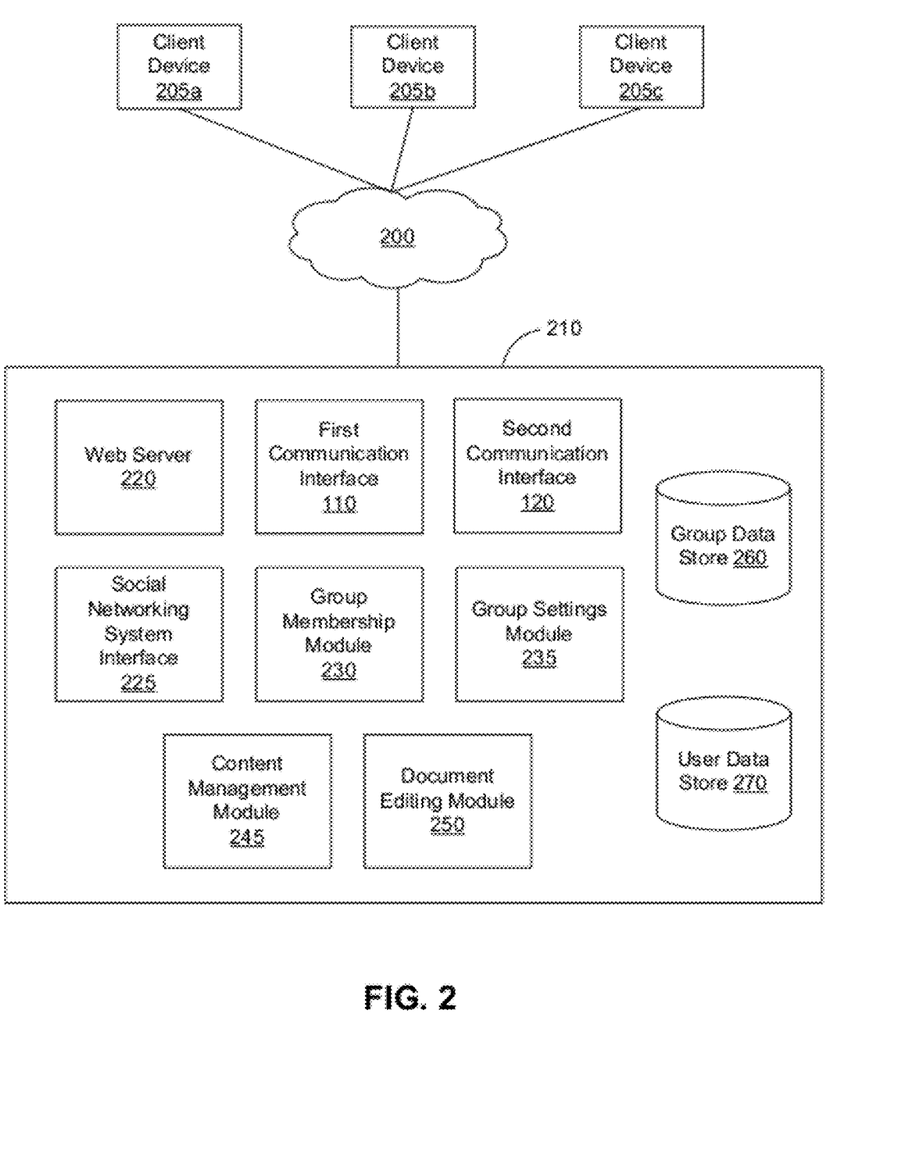
FIG. 2 is a high level block diagram illustrating a system environment suitable for instituting multiple communication interfaces and communication channels in a social networking system group, in accordance with one embodiment of the invention.

FIG. 2 is a high level block diagram illustrating a system environment suitable for providing multiple communication interfaces within a social networking system group, in accordance with an embodiment of the invention. The system environment comprises one or more users accessing the social networking system through client devices 205, a social networking system 210, and a connecting network 200. The connecting network may be the Internet, a local area network, or any other network that allows a client device 205 to connect to a social network's 210 servers. In alternative configurations, different and/or additional modules can be included in the system.

Users access the social networking system 210 through the connecting network 200 using a client device 205. A client device 205 comprises one or more computing devices that can receive user input and can transmit and receive data via the connecting network 200. In one embodiment, the client device 205 is a conventional computer system. In another embodiment, the client device 205 can be a mobile device having computer functionality, such as a personal digital assistant (PDA), mobile telephone, video game system, etc. The client device 205 is configured to communicate via connecting network 200. The client device 205 can execute an application, for example, a browser application or a native application that allows the client device 205 to interact with the social networking system 210. The interactions of the user via the application running on the client device 205 include but are not limited to uploading content items to the social networking system 210 and retrieving content items or information stored on the social networking system 210. The connecting network 200 may use standard communications technologies and/or protocols.

The social networking system 210 includes a web server 220, a first communication interface 110 and a second communication interface 120, a social networking system interface 225, a group membership module 230, a group settings module 235, a content management module 245, a document editing module 250, a group data store 260, and a user data store 270. In other embodiments, the social networking system 210 may include additional, fewer, or different modules for various similar or alternative applications. Conventional components such as network interfaces, security mechanisms, load balancers, failover servers, management and network operations consoles, and the like are not shown so as to not obscure the details of the system.

The social networking system 210 may comprise of a plurality of web pages, each of which present social networking system information. For example, these pages may include pages for user profiles, group profiles, search results, advertisements, and so forth. The web pages are served by the web server 220, which links the social networking system 210 via the connecting network 200 to one or more client devices 205. The web server 220 may also serve other web-related content, such as Java, Flash, XML, and so forth. The web server 220 may provide the functionality of receiving and routing content items between the social networking system 210 and the client devices 205. Content items include but are not limited to instant messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. A user can send a request to the web server 220 to upload information or content items which are then stored in the user data store 270 or the group data store 260 through the social networking system interface 225.

The social networking system interface 225 comprises the software and hardware utilized by the social networking system 210 to create, compile and provide social networking system web pages to the web server 220, which are then presented to a user when accessing the social networking system 210. The social networking system interface 225 is capable of providing a user access to social networking system data. When a user requests a content item from a social networking system webpage provided by the web server 220, the social networking system interface 225 fetches the content item from the user data store 270 or group data store 260, creates a social networking system web page which contains the content item, and provides the web page to the web server 220, which in turn presents the web page containing the content item to the user.

In creating social networking system web pages, the social networking system interface 225 may include a graphical user interface (GUI) in the design of the social networking system web page which allows a user to navigate throughout the social networking system 210. The web page GUI may contain toolbars with clickable links that (when clicked) present a user with a different web page within the social networking system 210. The webpage GUI may also contain fields which allow a user to communicate with other users, to perform searches of social networking system data, or to upload content items to the social networking system 210. Some or all of the social networking system web page GUI may be constant for all social networking system web pages created for and presented to the user, or may vary depending on type of web page created.

Group membership module 230 controls and tracks the membership of the group in accordance with the settings controlled by group settings module 235 and stored within group data store 260. Group data store 260 stores information about the group, such as the name of the group, the purpose of the group, any content items uploaded to the group, and the group's settings (such as the membership requirements, the content available to non-members, etc.). When a social networking system user requests to become a member of the group, the social networking system 210 retrieves the group membership requirements from the group data store 260; for instance, the social networking system 210 may retrieve information from the group data store 260 that membership in the group requires approval from a current group member. The retrieved setting is implemented by group settings module 235; if the user requests membership in a group with such an approval requirement for membership, group settings module 235 may send a message to current group members seeking approval for the user's membership. Likewise, a group member may use group settings module 235 to select or alter group settings, which are in turn stored in group data store 260.

When a user becomes a member of the group, the group membership module 230 connects the user's node and the group node. Likewise, when a group member leaves a group, the group membership module 230 removes the connection between the group user's node and the group node. Thus, the group membership module 230 tracks group membership by maintaining connections between group member nodes and the group node. The same or similar functionality of group membership module 230, group settings module 235 and group data store 260 may be combined or expanded into fewer or more components.

Content management module 245 implements a social networking system's system for managing content items. For instance, the content management module 245 may order the display of content items within a social networking system web page created by the social networking system interface 225 according to the time and date of upload for each content item. Likewise, the content management module 245 may order messages on a profile's wall according to the time the message was posted, or by the message that has most recently been commented on. Other means the content management module 245 may utilize include but are not limited to the time and date of content item creation, the type of content item, the content item format, the content item size, the identity of the user who uploads the content item, or the activity taken by a user.

Document editing module 250 allows a social networking system user to edit documents within the context of the social networking system. For instance, the social networking system may include a web page that allows one or more users to edit a document, such as a text document, a spreadsheet, a presentation, or other document within the web page. The social networking system may utilize plug-ins that incorporate document-editing software, such as Microsoft Office, into a social networking system document editing web page. The document editing module 250 may allow a plurality of social networking system users to edit a document simultaneously. Document editing may occur in the context of a group. For instance, a document may be uploaded to or created within the group, and the group may link to or provide a document-editing web page. The group may allow only group members to upload to or create a document within the group, and may allow only group members to edit a document within the group's document-editing web page.

Operation

Figure 3:
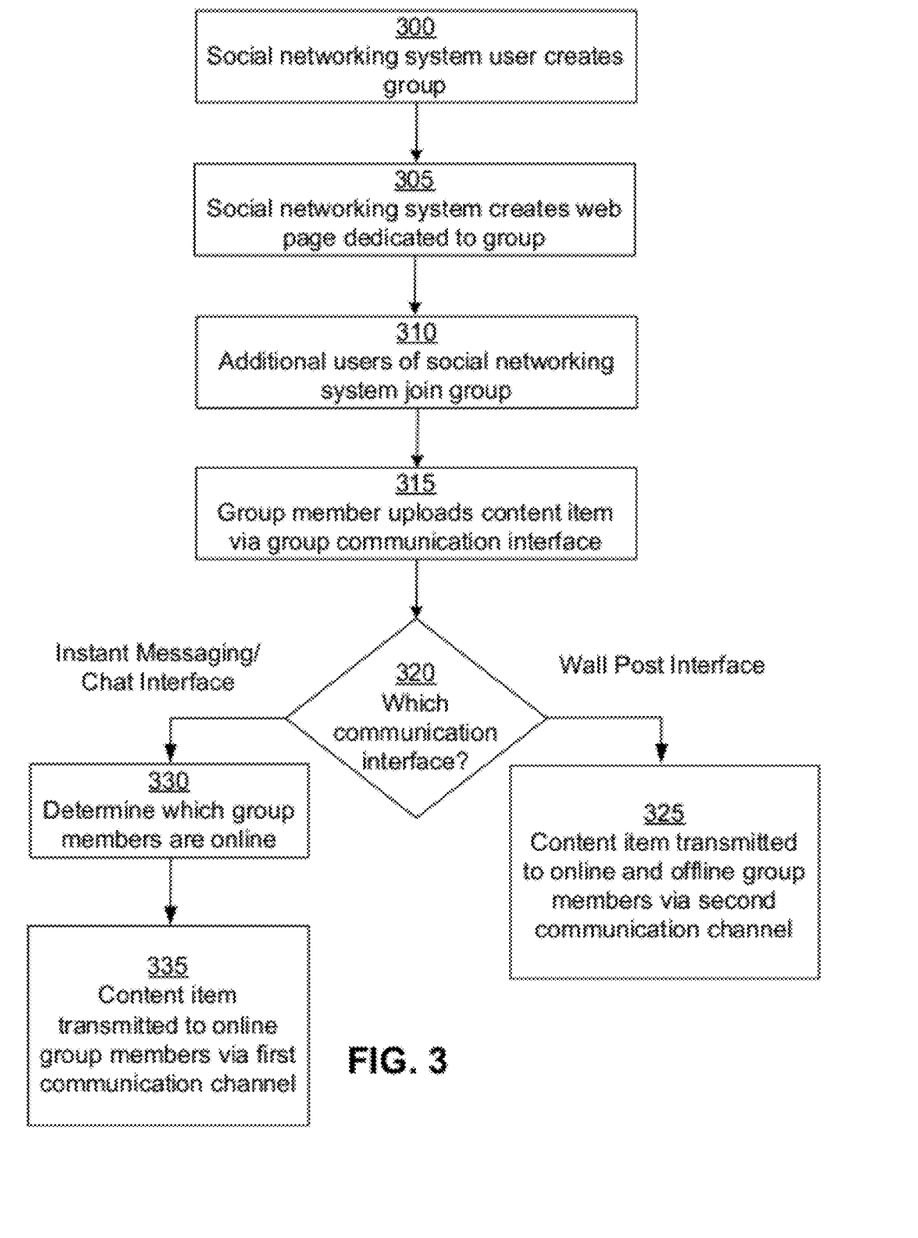
FIG. 3 is a flow chart of the process for communicating within a group via two communication interfaces, in accordance with one embodiment of the invention.

FIG. 3 is a flow chart of a process in which a member of a group communicates within the group via different communication interfaces, in accordance with one embodiment of the invention. First, a social networking system user creates 300 a group within a social networking system. Responsive to this, the social networking system creates 305 a web page within the social networking system dedicated to the group. After the web page is created, one or more additional social networking system users join 310 the group. When a group member wishes to communicate 315 with other members of the group, the group member uploads a content item to a group communication interface. In one embodiment of the present invention, the social networking system group has two communication interfaces, a first communication interface 110 and a second communication interface 120. In the example discussed below, the first communication interface is an instant messaging interface and the second communication interface is a social networking system group profile wall interface. The social networking system 210 determines 320 which communication interface the group member used to upload the content item.

Responsive to the group member uploading a content item via the wall interface, the wall interface transmits 325 the content item to online and offline members of the group via a second communication channel. Transmission of the content item to online and offline members of the group may comprise making the content item accessible to the group members. In one embodiment of the present invention, transmission comprises storing the content item within the social networking system 210 where it is accessible to group members. In an alternative embodiment of the present invention, transmission comprises direct electronic transmission of the content item to group members' client devices outside of the context of the social networking system 210. In one embodiment, the second communication interface 120 transmits the content item to every member of the group, whether offline or online. In an alternative embodiment, the content item is transmitted to a subset of the offline and online members of the group. In yet another embodiment, notification of the transmission of the content item is sent to offline and online members of the group.

In one embodiment, transmission via the second communication channel comprises embedding the content item into the group's profile or wall, where the content item is viewable to all or a subset of the group's members. In another embodiment of the present invention, transmission via the second communication channel comprises sending an email from the web server 220 to a group member's social networking system inbox or personal email account. In yet another embodiment of the present invention, transmission via the second communication channel comprises uploading the content item to the group data store 270, where it is accessible to members of the group via the social networking system group web page.

In one embodiment, a user can subscribe to a content item; any future communication involving the subscribed content item is transmitted to the user. For instance, if a first user uploads a photograph to the social networking system 210, a second user can subscribe to the photograph. Afterwards, if a third user posts a comment on the web page containing the photograph, a message is sent to the second user containing the comment (for instance, via email), or a notification of the comment is sent to the second user. Within the context of a wall post, a first user may upload a content item (such as a text message) to a group's wall; if a second user comments on the content item, any future communication or notification of future communication regarding the content item is transmitted to the second. Subscription to a content item or profile may be automatic responsive to an action taken by a social network user, such as by commenting on a content item or joining a group. Likewise, subscription may be manual, requiring a user to click a link in order to subscribe to a content item or profile. A user may be required to be a member of a group in order to subscribe to the group's profile or to content items uploaded to the group.

In one embodiment, the second communication interface 120 is accessible through the social networking system group web page. In one embodiment of the present invention, the second communication interface 120 comprises a portion of a social networking system group web page GUI. For instance, a social networking system group web page may have a group communication field within the group's profile or wall which allows a group member to upload a content item. In an embodiment of the present invention, the content item is immediately visible to other group members when viewing the social networking system group web page profile or wall.

The second communication interface 120 may be accessible to a group member when viewing any social networking system web page, or the second communication interface 120 may be accessible to a group member only when viewing the social networking system group web page. The he second communication interface 120 may comprise a social networking system web page separate from the group web page which allows a group member to upload a content item. In such an embodiment, the web page for uploading content items may be linked to from within the group web page. The second communication interface 120 may comprise an email address that a group member must send the content item to via email.

Responsive to the group member uploading a content item via the instant messaging interface, the social networking system 210 determines 330 which group members are currently online. The instant messaging interface transmits 335 the content item to the online members of the group via a first communication channel. Transmission of the content item to online members of the group may comprise making the content item accessible to the online group members. In one embodiment, transmission comprises storing the content item within the social networking system 210 where it is accessible to group members. In an alternative embodiment of the present invention, transmission comprises direct electronic transmission of the content item to an online group member's client device outside of the context of the social networking system 210. In one embodiment of the present invention, the instant messaging interface transmits the content item to every online member of the group; in an alternative embodiment, the content item is transmitted to a subset of online group members.

In one embodiment, transmission via the first communication channel comprises sending the content item to online group members via a chat message or an instant message. In one embodiment, the first communication channel utilizes a social networking system's built-in instant message functionality and may display the chat message to an online group member within the group web page GUI. In an alternative embodiment, the chat message is displayed in the GUI of any social networking system web page that the online group member is viewing. In an alternative embodiment, the chat message is sent through third-party instant messaging software. In one embodiment, the first communication channel utilizes a group chat among a plurality of online group members; in such an embodiment, the content item is transmitted to the plurality of online group members and these members are able to respond to the content item and further communicate with each other within the same interface. In another embodiment, transmission via the first communication channel comprises sending an email from the web server 220 to an online group member's social networking system inbox or personal email account. In yet another embodiment of the present invention, transmission via the first communication channel comprises uploading the content item to the group data store 270, where it is accessible to online members of the group via the social networking system group web page. Content items uploaded via the first communication interface and stored in group data store 270 may be made available to members of the group who were offline when the content item was uploaded. Such content items may be accessible through a "history" link in the social networking system group web page GUI.

In an embodiment, the first communication interface 110 is accessible through the social networking system group web page. In one embodiment of the present invention, the first communication interface 110 comprises a portion of a social networking system group web page GUI. For instance, a social networking system group web page GUI may permanently contain an embedded window where chat messages with group members may be sent, received and displayed. Alternatively, when a content item is received by the social networking system, a temporary chat window may be created within the group web page GUI. Likewise, a temporary chat window may be created outside of the context of the group web page, outside of the context of the social networking system, and outside of the context of the web browser or other software being used to access the social networking system. In an embodiment, the content item is displayed only in the chat window of group members currently viewing the group web page. Alternatively, the content item may be displayed to group members accessing any social networking system web page.

In one embodiment, the first communication interface 110 is accessible to a group member when the group member is viewing any social networking system web page. In another embodiment, the first communication interface 110 is only accessible to a group member when viewing the social networking system group web page. In yet another embodiment, the first communication interface 110 comprises a social networking system web page separate from the group web page which allows a group member to upload a content item. This web page for uploading content items may be linked to from within the group web page.

In one embodiment, the first communication interface 110 and the second communication interface 120 are both imbedded within the social networking system web page GUI. The interfaces may each be accessed via a separate field within the web page GUI, or the interfaces may share a field within the GUI, allowing a group member to manually choose which interface the group member uploads a content item to. The first communication interface 110 and the second communication interface 120 may be imbedded only within the group web page GUI; alternatively, the first communication interface 110 and the second communication interface 120 may be imbedded within the GUI of any web page within the social networking system.

Transmission of a content item via the first communication channel may be limited to transmission to online group members who have subscribed to a particular content item or profile. For example, if a first group member creates an event on a group calendar, a second group member seeking a ride to the event may send an instant message to other group members who are online and who have subscribed to the event. Alternatively, transmission of a content item via the second communication channel may be limited to transmission to online and offline group members who have subscribed to a particular content item or profile. For example, if a first group member uploads a picture to the group profile, and a second group member comments on the picture, the second group member's comment is transmitted only to group members who have subscribed to the picture.

In one embodiment, a document-editing web page accessible to a group may comprise the first communication interface 110 or the second communication interface 120, or both. The document editing web page may be contained within a social networking system group web page GUI, or may be linked to within the group, for instance through a link found in the group's profile. In one embodiment of the present invention, the document editing web page may be outside of the context of the social networking system. In one embodiment of the present invention, only members of a group may edit a document. In one embodiment of the present invention, more than one online group member may edit a document within a document-editing web page simultaneously, with edits being visible to online group members viewing the document editing web page. Edits to a document made within a document-editing web page may comprise content items uploaded via the first communication interface 110 or the second communication interface 120. Updating the document-editing web page with the edits made by group members may comprise transmission of a content item via the first communication channel or the second communication channel. Notifications of document uploads or edits may be sent to members of the group.

Figure 4:
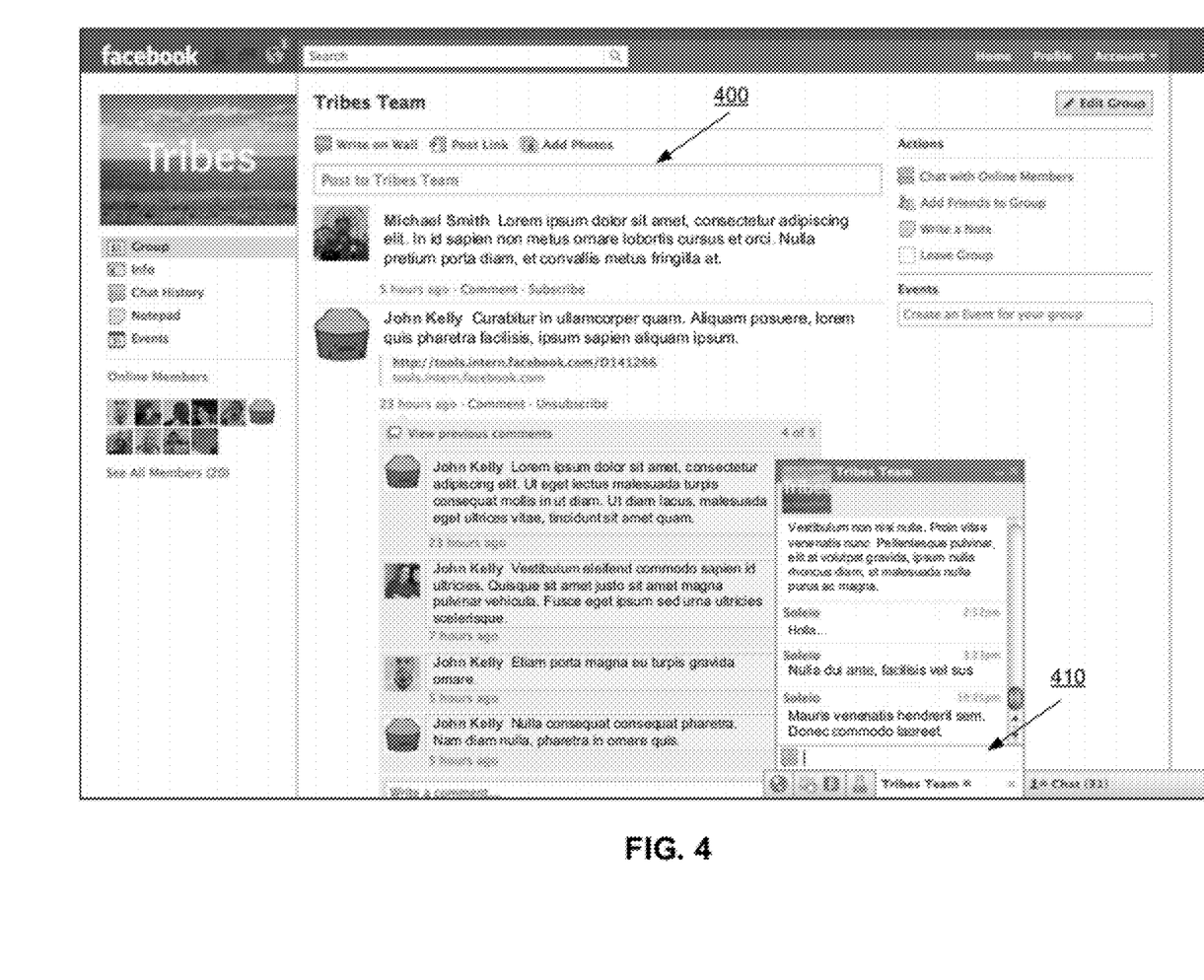
FIG. 4 is a screen shot of a social networking system web page containing two communication interfaces, in accordance with the embodiment of the invention of FIG. 3.

FIG. 4 is an example screen shot of a social networking system web page containing two communication interfaces, in accordance with the embodiment of the invention highlighted in FIG. 3. This embodiment contains two communication interfaces, a first communication interface and a second communication interface. The first communication interface is the group wall post field 400. Content items uploaded via the group wall post field 400 will be immediately visible to all members of the group. In addition, notifications may be sent to all members indicating the content item posted to the group wall. The second communication interface is the instant messaging field 410. Content items uploaded via the instant messaging field 410 will be immediately visible to all online members of the group. This example screen shot is more illustrative purposes only, and is not meant to limit the scope of the claimed invention in any way.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining a list of members of a social networking system group, each group member being a user of a social networking system, each group member having previously opted to join the group, and the group comprising less than all users of the social networking system;
   providing a web page for the group, wherein the web page contains a first communication channel for uploading content items to a chat window that enables real-time communication among a plurality of members of the group, and a second communication channel enabling members of the group to view or upload content items to a message board within the web page;
   receiving from a group member a selection of the first or second communication channel and a first content item to send to the group using the selected communication channel;
   determining by the social networking system a recipient list comprising a subset of group members selected based on the selection of the first or second communication channel, wherein the recipient list comprises the group members who are currently online if the first content item is uploaded to the chat window, and all group members if the first content item is uploaded to the message board within the web page;
   transmitting the content item in the selected communication channel to the group members who are on the recipient list;
   receiving from a second group member a second selection of the first or second communication channel and a second content item to send to the group using the communication channel selected by the second group member;
   determining by the social networking system a second recipient list comprising a second subset of group members selected based on the selection of the first or second communication channel by the second group member, wherein the second recipient list comprises group members that have subscribed to the first content item and who are currently online if the second content item is uploaded to the chat window, and all group members that have subscribed to the first content item if the second content item is uploaded to the message board within the web page; and
   transmitting the second content item in the communication channel selected by the second group member to the group members who are on the second recipient list.

2. The method of claim 1, wherein displaying the first content item within the chat window comprises making the first content item visible within the chat window only for members of the group who are online when the first content item is uploaded.

3. The method of claim 1, wherein the chat window is displayed to online members of the group in response to the first content item being uploaded.

4. The method of claim 1, wherein displaying the first content item within the message board comprises making the first content item visible to all members of the group who access the group message board.

5. The method of claim 1, wherein communication that occurs within a chat window is subsequently viewable from within the group web page.

6. The method of claim 5, wherein communication that occurs within a chat window is subsequently viewable by members of the group that participated in the communication.

7. The method of claim 1, wherein the transmitted first content item is transmitted only to the members of the group who are on the recipient list.

8. The method of claim 1, wherein a notification about the transmission of the first content item is sent to online members of the group.

9. The method of claim 1, wherein a notification about the transmission of the first content item is sent to online and offline members of the group.

10. The method of claim 1, wherein the chat window is provided by a third-party instant messaging provider.

11. The method of claim 1, wherein transmitting the first content item via the second communication channel further comprises sending an email containing the content item.

12. The method of claim 1, wherein sending an email containing the first content item comprises sending an email to an email account provided by the social networking system.

13. The method of claim 1, wherein sending an email containing the first content item comprises sending an email to an email account provided by a third-party email provider.

14. The method of claim 1, wherein transmitting via the first communication channel and transmitting via the second communication channel comprises transmitting a content item only to members of the group who have subscribed to receive content items.

15. The method of claim 1, further comprising:
providing a document-editing interface that enables online members of the group to view and edit a document.

16. The method of claim 1, wherein transmitting the first content item via the second communication channel comprises incorporating the first content item into a document-editing webpage.

17. The method of claim 1, wherein content items sent via the first communication channel are made accessible through the social networking system to all members of the group for subsequent viewing, including the members of the group who were not online when the content items were sent.

18. The method of claim 1, wherein a content item comprises one of: an instant message; an email; a text or SMS message; an HTTP link; an image; a video; an audio clip; a document; a document edit; and a calendar entry.

19. A system comprising:
a computer processor; and
a computer-readable storage medium storing computer program modules configured to execute on the computer processor, the computer program modules comprising:
a group membership module configured to maintain a list of members of a social networking system group, each group member being a user of a social networking system, each group member having previously opted to join the group, and the group comprising less than all users of the social networking system;
a communication interface module configured to provide a web page for the group, wherein the web page contains a first communication channel for uploading content items to a chat window that enables real-time communication among a plurality of members of the group, and a second communication channel enabling members of the group to view or upload content items to a message board within the web page;
a transmission module configured to:
receive from a group member a selection of the first or second communication channel and a first content item to send to the group using the selected communication channel;
determine by the social networking system a recipient list comprising a subset of group members selected based on the selection of the first or second communication channel, wherein the recipient list comprises the group members who are currently online if the first content item is uploaded to the chat window, and all group members if the first content item is uploaded to the message board within the web page;
transmit the content item in the selected communication channel to the group members who are on the recipient list;
receiving from a second group member a second selection of the first or second communication channel and a second content item to send to the group using the communication channel selected by the second group member;
determining by the social networking system a second recipient list comprising a second subset of group members selected based on the selection of the first or second communication channel by the second group member, wherein the second recipient list comprises group members that have subscribed to the first content item and who are currently online if the second content item is uploaded to the chat window, and all group members that have subscribed to the first content item if the second content item is uploaded to the message board within the web page; and
transmitting the second content item in the communication channel selected by the second group member to the group members who are on the second recipient list.

20. The system of claim 19, wherein the transmitted first content item is transmitted only to the members of the group who are on the recipient list.

* * * * *